(12) United States Patent
Trpkovski et al.

(10) Patent No.: US 6,606,837 B2
(45) Date of Patent: Aug. 19, 2003

(54) METHODS AND DEVICES FOR SIMULTANEOUS APPLICATION OF END SEALANT AND SASH SEALANT

(75) Inventors: Paul Trpkovski, Loganville, WI (US); Eric B. Rapp, Avoca, WI (US)

(73) Assignee: Cardinal IG, Spring Green, WI (US)

( * ) Notice: Subject to any disclaimer, the term of this patent is extended or adjusted under 35 U.S.C. 154(b) by 0 days.

(21) Appl. No.: 09/940,967

(22) Filed: Aug. 28, 2001

(65) Prior Publication Data

US 2003/0041557 A1 Mar. 6, 2003

(51) Int. Cl.$^7$ ................................................ E04B 1/74
(52) U.S. Cl. ................ 52/745.19; 52/745.15; 52/172; 52/39 B; 156/109; 156/244.18; 156/244.23
(58) Field of Search ................ 52/786.11, 786.13, 52/788.1, 745.15, 658, 745.19, 741.15, 171, 172, 232, 398, 399, 400; 29/527.1, 527.4, 897.312; 156/109, 244.18, 244.23

(56) References Cited

U.S. PATENT DOCUMENTS

| | | | |
|---|---|---|---|
| 3,876,489 A | 4/1975 | Chenel | |
| 3,950,199 A | 4/1976 | Lucas | |
| 3,957,406 A | 5/1976 | Battersby | |
| 4,076,863 A | 2/1978 | Onoki et al. | |
| 4,080,482 A | * 3/1978 | Lacombe | 428/34 |
| 4,201,562 A | 5/1980 | Hofmann et al. | |
| 4,215,165 A | 7/1980 | Gras et al. | |
| 4,224,365 A | 9/1980 | Ali-Zaidi | |
| 4,247,355 A | 1/1981 | Friedrich et al. | |
| 4,250,068 A | 2/1981 | Ali-Zaidi | |
| 4,264,658 A | 4/1981 | Tobias et al. | |
| 4,289,816 A | 9/1981 | Fogelberg et al. | |
| 4,304,802 A | 12/1981 | Mosse et al. | |
| 4,308,818 A | 1/1982 | Abe et al. | |
| 4,335,166 A | 6/1982 | Lizardo et al. | |
| 4,369,084 A | 1/1983 | Lisec | |
| 4,374,879 A | 2/1983 | Roberts et al. | |
| 4,467,068 A | 8/1984 | Maruyama et al. | |
| 4,677,934 A | 7/1987 | Maeda et al. | |
| 4,707,076 A | 11/1987 | Skutnik et al. | |
| 4,708,762 A | 11/1987 | Lenhardt | |
| 4,743,336 A | 5/1988 | White | |
| 4,780,164 A | 10/1988 | Rueckheim et al. | |
| 4,803,764 A | 2/1989 | Lenhardt et al. | |
| 4,826,547 A | 5/1989 | Lenhardt | |
| 4,872,896 A | 10/1989 | LaCourse et al. | |
| 4,891,241 A | 1/1990 | Hashimoto et al. | |
| 4,909,874 A | 3/1990 | Rueckheim | |
| 4,961,976 A | 10/1990 | Hashimoto et al. | |
| 4,962,721 A | 10/1990 | Peek | |
| 4,985,286 A | 1/1991 | Kurita et al. | |
| 5,017,252 A | 5/1991 | Aldrich et al. | |

(List continued on next page.)

FOREIGN PATENT DOCUMENTS

| | | |
|---|---|---|
| DE | 28 34 902 | 2/1980 |
| DE | 32 17 410 | 11/1983 |
| EP | 0 069 021 | 1/1983 |
| FR | 2 251 421 | 6/1975 |
| FR | 2 451 988 | 10/1980 |
| WO | WI 95/05349 | 2/1995 |

Primary Examiner—Carl D. Friedman
Assistant Examiner—Yvonne M. Horton
(74) Attorney, Agent, or Firm—Allen W. Groenke; Fredrikson & Byron, P.A.

(57) ABSTRACT

The present invention provides for an apparatus and method for applying adhesive to the end seals and/or the side glass surface of an insulating glass (IG) window unit to be mounted in a frame or sash. An apparatus and method of using the apparatus is provided by which adhesive is applied to the end regions of the insulating glass unit with one or more nozzles while a separate side arm extends from the device and alongside the insulating glass unit having a nozzle that delivers adhesive bead to the side of the pane to be adhered to the frame or sash.

30 Claims, 15 Drawing Sheets

U.S. PATENT DOCUMENTS

| | | |
|---|---|---|
| 5,034,061 A | 7/1991 | Maguire et al. |
| 5,112,658 A | 5/1992 | Skutnik et al. |
| 5,319,186 A | 6/1994 | Lenhardt |
| 5,325,579 A | 7/1994 | Baier |
| 5,339,583 A | 8/1994 | Hrdlicka et al. |
| 5,350,469 A | 9/1994 | Lenhardt et al. |
| 5,361,476 A * | 11/1994 | Leopold ................ 29/417 |
| 5,366,574 A | 11/1994 | Lenhardt et al. |
| 5,413,156 A | 5/1995 | Lisec |
| 5,439,716 A | 8/1995 | Larsen |
| 5,458,682 A | 10/1995 | Stulpin et al. |
| 5,476,124 A | 12/1995 | Lisec |
| 5,476,692 A | 12/1995 | Ellis et al. |
| 5,501,013 A * | 3/1996 | Misera et al. .......... 29/897.312 |
| 5,567,235 A | 10/1996 | Carson et al. |
| 5,573,618 A | 11/1996 | Rueckheim |
| 5,599,422 A | 2/1997 | Adams, Jr. et al. |
| 5,626,712 A | 5/1997 | Lisec |
| 5,645,678 A | 7/1997 | Lisec |
| 5,676,782 A | 10/1997 | Lisec |
| 5,679,419 A | 10/1997 | Larsen |
| 5,705,010 A | 1/1998 | Larsen |
| 5,714,214 A | 2/1998 | Larsen |
| 5,753,069 A | 5/1998 | Rueckheim |
| 5,759,272 A | 6/1998 | Lisec |
| 5,759,618 A | 6/1998 | Taylor |
| 5,762,739 A | 6/1998 | Lenhardt et al. |
| 5,866,260 A | 2/1999 | Adams, Jr. et al. |
| 5,957,169 A | 9/1999 | Trpkovski |
| 6,013,333 A | 1/2000 | Carson et al. |
| 6,096,394 A | 8/2000 | Jenkner et al. |
| 6,120,908 A | 9/2000 | Papanu et al. |
| 6,158,483 A | 12/2000 | Trpkovski |
| 6,197,231 B1 | 3/2001 | Lisec |
| 6,223,414 B1 * | 5/2001 | Hodek et al. ............ 29/527.1 |
| 6,234,355 B1 | 5/2001 | Lenhardt |
| 6,245,145 B1 | 6/2001 | Lisec |
| 6,250,026 B1 * | 6/2001 | Thompson, Jr. ............ 52/172 |
| 6,415,561 B2 * | 7/2002 | Thompson, Jr. ............ 52/172 |
| 6,477,812 B2 * | 11/2002 | Boone et al. ................ 52/172 |

\* cited by examiner

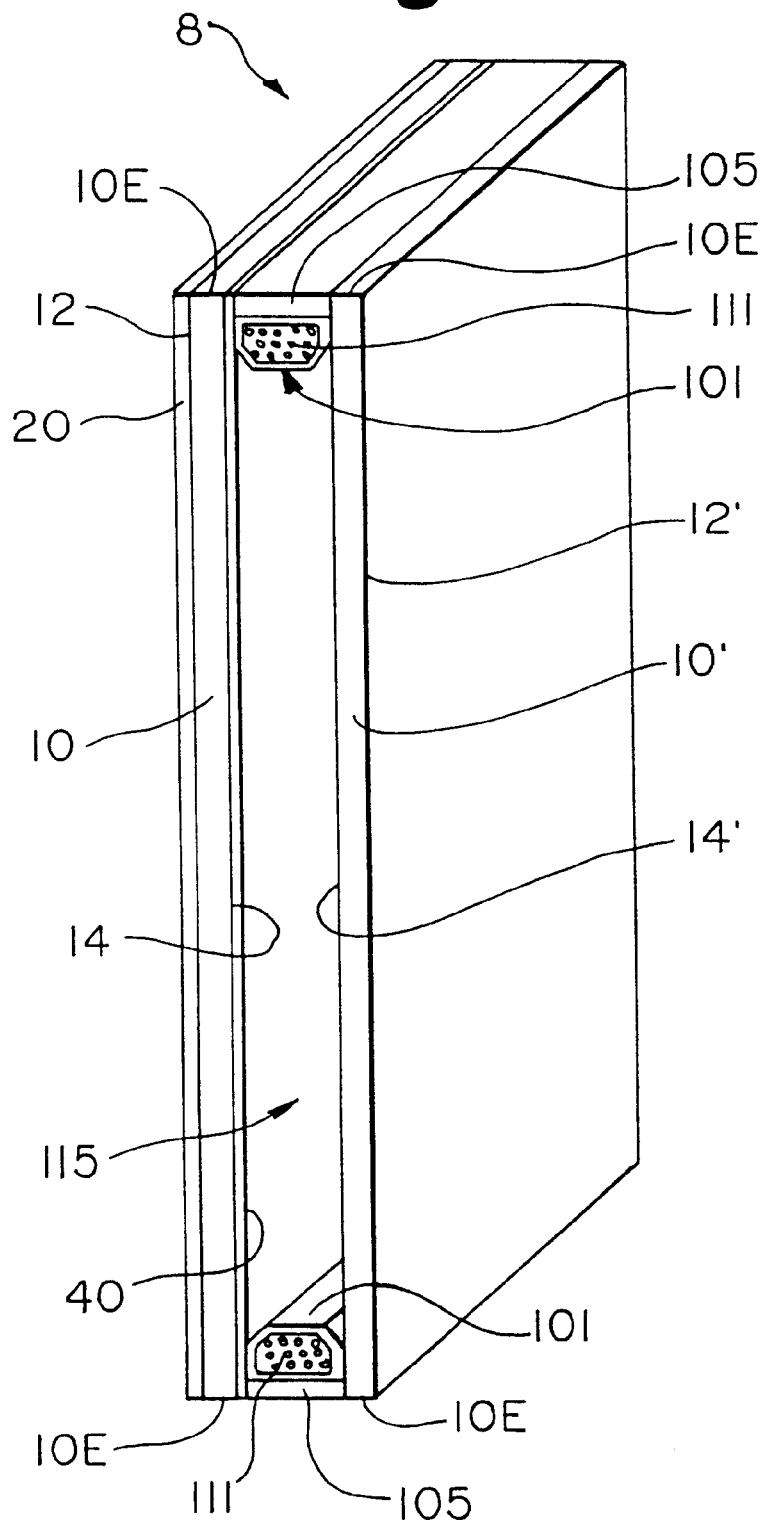

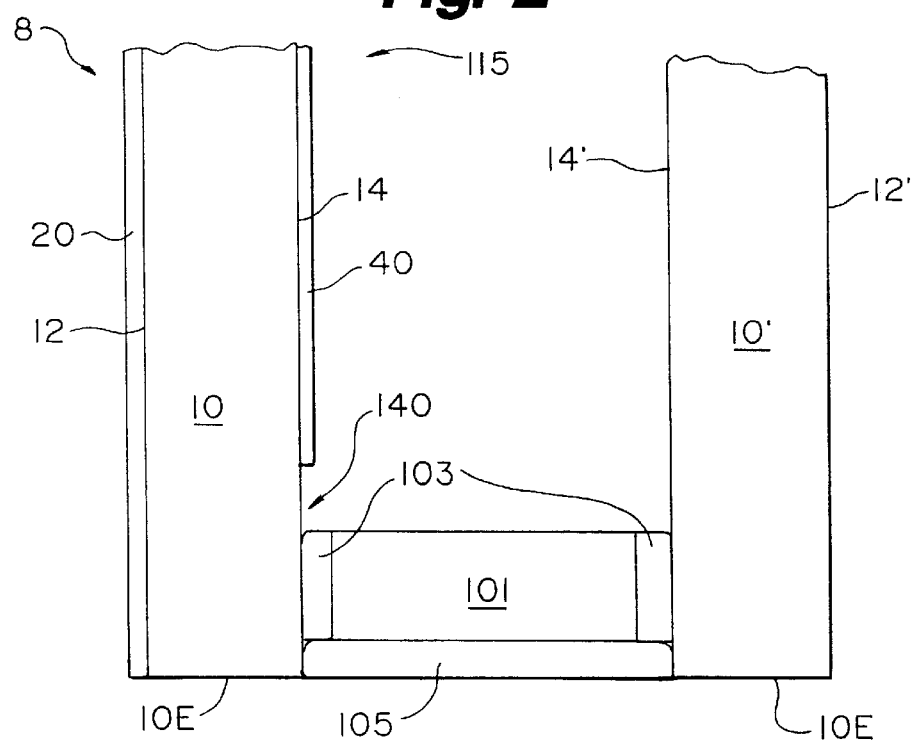
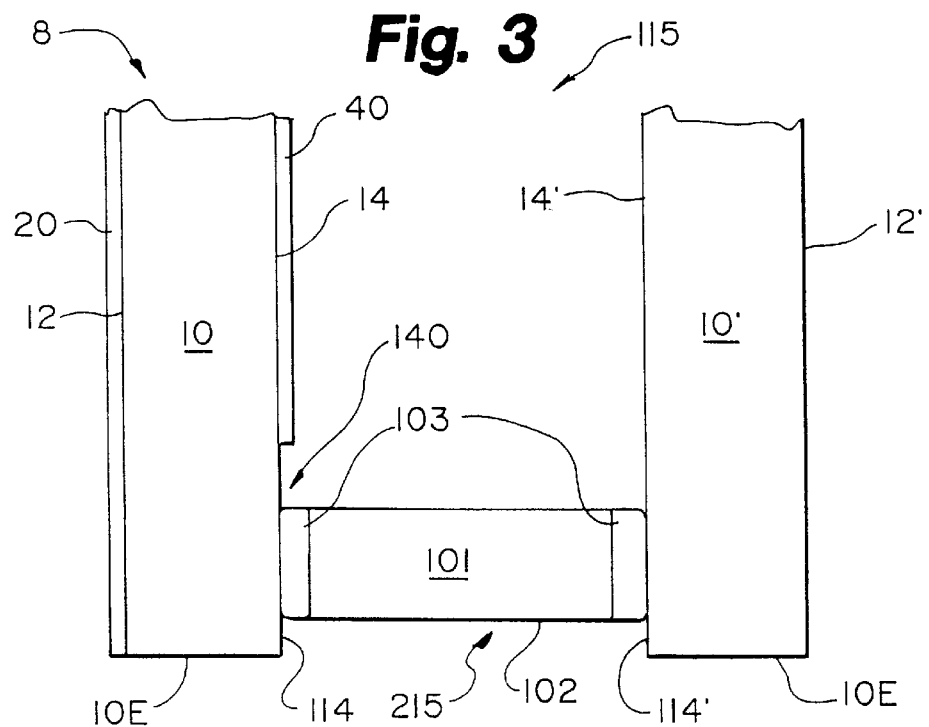

US 6,606,837 B2

METHODS AND DEVICES FOR SIMULTANEOUS APPLICATION OF END SEALANT AND SASH SEALANT

FIELD OF THE INVENTION

The present invention relates to multiple-pane insulating glass units. More particularly, the invention relates to the application of end sealant and sash sealant to insulating glass units.

BACKGROUND OF THE INVENTION

In most industrialized countries, windows touch people's lives everyday. Wherever people work and live there are windows. Windows allow the occupants of a building to view the outside world while allowing sun light to enter the interior of the building. Sunlight is a natural antidepressant and helps the human body produce vitamin D. Thus, a certain amount of sunshine is essential to mental and physical well being.

Human beings have a relatively narrow temperature range in which they are comfortable. Unfortunately, infra red (IR) energy from the sun entering a room through a window can quickly raise the temperature to an uncomfortable level. Many windows include low emissivity coatings which have been developed to prevent heat spikes within a room by reflecting a large portion of incident infra red energy.

In northern climates significant energy may be lost through windows during the winter when a building is being heated. With the rising cost of energy, efforts have been made to provide homes and other buildings with insulation which will more efficiently prevent the loss of heat to the outside. Modern buildings often include insulating glass units. Insulating glass units have been developed to reduce the amount of heat lost through windows. There are basically three types of insulating glass units commercially available today. These three types are often referred to as single glazing, double glazing, and triple glazing. Double glazed insulating glass units are the most common. These insulating glass units include a space sealed between two panes of glass. This sealed space provides insulation, the insulating effect may be enhanced by filing the space with an insulative gas such as argon, or krypton. Compared with a single pane, a double glazed insulating glass unit can cut heat loss through a window nearly in half.

Many office buildings include insulating glass units having a mirror-like coating. This coating cuts down on glare and allows officer workers to work efficiently even while facing the window. This type of insulating glass unit is sometimes referred to as architectural glass. Different colors of mirrored coating can be manufactured to provide a desired architectural appearance. Examples of colors include gold, green, silver and blue.

SUMMARY OF THE INVENTION

The present invention relates to multiple-pane insulating glass units. More particularly, the invention relates to the application of end sealant and sash sealant to insulating glass units. The present invention provides apparatus' and methods for applying adhesive to the end seals and/or the side glass surface of an insulating glass (IG) window unit to be mounted in a frame or sash.

An insulating glass unit generally includes one or more parallel-opposed panes defining, with said panes, a sealed gas space having a spacer frame in between. The spacer frame has a first pair of seals between each side of the spacer frame and the opposing pane face and a second seal or pair of seals extending between the panes outside the outer peripheral face of the spacer frame. When the insulating glass units are to be mounted to the frame/sash, a bead of adhesive may be placed along the perimeter of the glass surface that will be mounted against the frame/sash. An apparatus and method of using the apparatus is provided by which adhesive is applied to the end regions of the insulating glass unit with one or more nozzles while a separate side arm extends from the device and alongside the insulating glass unit having a nozzle that delivers adhesive bead to the side of the pane to be adhered to the frame or sash.

One method of fabricating a window assembly in accordance with the present invention includes the step of positioning an applicator proximate the first edge of a first pane of an insulating glass unit. A first deposit may be applied to an inside face of the first pane by the applicator, and a second deposit may be applied to an outside face of the first pane. In an advantageous embodiment, the first deposit and the second deposit are applied substantially simultaneously.

In certain implementations, a method in accordance with the present invention may further include the steps of providing a window sash, and bringing together the outside face of the first pane, and the window sash so that the insulating glass unit is bonded to the window sash by the second deposit. In other implementations, a method in accordance with the present invention may further including the step of simultaneously applying a third deposit to an inside face of a second pane of the insulating glass unit. In yet another implementation, a method in accordance with the present invention may include the step of simultaneously applying a fourth deposit to an outside face of the second pane.

In some implementations in accordance with the present invention, the first deposit and the second deposit comprise the same material. For example, the first deposit and the second deposit may both comprise a sealant material (e.g., silicone sealant). In other implementations, the first deposit and the second deposit may comprise different materials.

In an advantageous implementation, a method in accordance with the present invention may include the step of urging the applicator toward the spacer of the insulating glass unit with a preselected force. In a particularly advantageous implementation, the preselected force may be chosen to yield a desired thickness of deposit.

In some implementations of the present invention, the preselected force may be provided by a biasing mechanism. In certain implementations, the biasing mechanism may include an air cylinder coupled to a slide. When this is the case, the step of urging the applicator toward the spacer of the insulating glass unit with a preselected force may include the step of maintaining a preselected pressure within a chamber of the air cylinder.

A method of in accordance with the present invention may include the step of moving the applicator relative to the insulating glass unit. In some implementations, a method in accordance with the present invention, the step of moving the applicator relative to the insulating glass unit may include the step of moving the applicator along a first axis that is generally parallel to the first edge of the first pane. In other implementations, a method in accordance with the present invention, the step of moving the applicator relative to the insulating glass unit may include the steps of moving the applicator along a first axis and moving the applicator along a second axis, the second axis being disposed at about a 90 degree angle relative to the first axis. The step of rotating the applicator by an angle of rotation may be advantageously interposed between the step of moving the applicator along the first axis and the step of moving the applicator along the second axis. In a particularly advantageous implementation, the angle of rotation may be about a 90 degree angle.

BRIEF DESCRIPTION OF THE DRAWINGS

FIG. 1 is a perspective view of an insulating glass unit;

FIG. 2 is a sectional view of an end portion of an insulating glass unit following application of first and second seals;

FIG. 3 is a sectional view of an end portion of an insulating glass unit following application of the first seal, but prior to application of the second seal;

DETAILED DESCRIPTION

Figure 4:
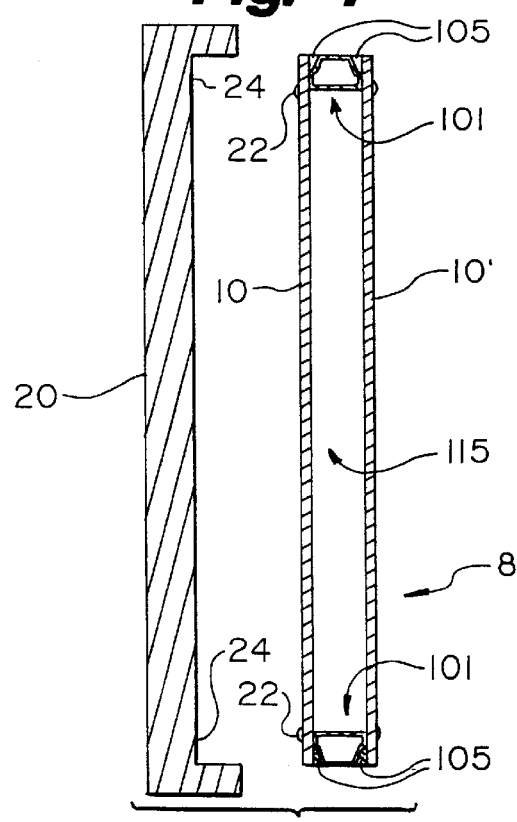
FIG. 4 is a sectional view of an insulating glass unit following application of first and second seals and sash glazing.

In the following detailed description of preferred embodiments, reference is made to the accompanying drawings, which form a part of the detailed description, and which illustrate specific embodiments of the present invention. It is to be understood that other embodiments can be utilized and that changes to structure and process can be made without departing from the scope of the invention.

FIG. 1 is a perspective view of an insulating glass unit in accordance with the present invention. An insulating glass unit typically comprises two or more panes of glass held in a spaced-apart relationship by a spacer. The inner peripheral surfaces of the panes 10, 10' are joined by a spacer 101 to define a sealable interpane space (or "gas space") 115. This gas space can be provided with an insulative gas fill to enhance the insulative properties of the unit. Alternatively, the gas space may simply contain air or a vacuum.

Typically, the spacer 101 is formed of sections of metal or plastic tubing. This tubing can be provided in a variety of cross sectional configurations. The spacer typically includes two generally-opposed lateral surfaces, which are adapted to be bonded to inner peripheral surfaces of the spaced-apart panes. Particularly advantageous spacer designs are provided in U.S. Pat. Nos. 5,439,716, 5,377,473, 5,679,419, 5,705,010, and 5,714,214, the entire teachings of each of which are incorporated herein by reference.

An insulating glass unit typically includes a primary or "first" seal and a secondary or "second" seal. This is best seen in FIG. 2, wherein the first seal is designated by the reference numeral 103, and the second seal is designated by the reference numeral 105. The first seal may be formed of a non-setting extrudable thermoplastic material that is largely impermeable to moisture vapor and gases (e.g., air, and any insulative gas fill). The first seal 103 preferably comprises of a butyl sealant (e.g., polyisobutylene). As illustrated in FIG. 2, the first seal 103 is typically applied between the lateral surfaces of the spacer 101 and the confronting inner surfaces of the panes. This seal 103 provides resistance to the permeation of air and moisture into the gas space 115. Likewise, when the gas space 115 is filled with insulative gas, the first seal 103 acts to contain the insulative gas within the gas space 115. During assembly of the insulating glass unit, the first seal 103 is preferably applied prior to application of the second seal 105. Thus, the first seal 103 also facilitates assembly of the insulating glass unit by securing the spacer 101 in position while the second seal 105 is applied and cured.

The second seal may be formed of any material having suitable adhesive properties. For example, this seal may comprise silicone, polysulfide, polyurethane, or any other material that forms a bond with the spacer and panes. In the embodiment of FIGS. 2 and 3, the second seal 105 is deposited into a peripheral channel 215 (illustrated in FIG. 3) formed at the edge of the insulating glass unit. This peripheral channel 215 is bounded by the outer face 102 of the spacer 101 together with the peripheral inner surfaces 114, 114' of the panes 10, 10'. Thus, the spacer 101, together with the first 103 and second 105 seals, isolates the atmosphere in the gas space 115 from the ambient environment.

Preferably, a bead of sealant is also applied along the outer peripheral surface of at least one of the panes of the insulating glass unit before the unit is assembled into a sash or frame. This bead of sealant may be referred to as the "sash glazing" or "sash bead." As is best seen in FIG. 4, the sash bead 22 is provided to seal the insulating glass unit 8 to the sash or frame 20. Thus, the material used for the sash bead 22 is preferably one that will form a bond between the insulating glass unit 8 and the sash or frame 20.

The sash bead 22 and second seal 105 may be applied in separate steps. This is undesirable for a number of reasons. For example, the extra time needed to carry out separate sealant applications makes such a process unnecessarily inefficient. It also increases the risk that insulating glass units will be damaged. For example, it is preferable to minimize the number of processing steps that are performed on an insulating glass unit to minimize the risk of damage. This risk is particularly acute given the breakable nature of conventional glass and the likelihood that at least one of the panes of each insulating glass unit will be provided with a thin film coating 20 (e.g., a solar control film 40), which may be especially vulnerable to being scratched.

Thus, the more processing steps that are performed on an insulating glass unit, the greater the risk the insulating glass unit will be damaged by contact with sealant applicators or other machinery on the assembly line. Moreover, extra machinery is typically required to carry out separate applications of end seal 105 and sash bead 22. Other inefficiencies include the need to monitor multiple application devices or a single device during multiple applications.

In a preferred embodiment, panes 10, 10' comprise glass. However, other transparent or translucent materials can also be used. Examples of materials which may be suitable in some applications include acrylic thermoplastic and polycarbonate. Moreover, the panes of an insulating glass unit can be formed of opaque materials in applications where it is not necessary to see through the panes.

As noted above, the panes 10, 10' are held in a spaced-apart relationship by a spacer 101. In more detail, the spacer 101 has two generally-opposed lateral surfaces that are bonded to inner, peripheral surfaces of the panes 10, 10'. Thus, the confronting inner surfaces 14, 14' of the panes 10, 10' define, together with spacer 101, a sealed gas space (or "interpane space") 115. As noted above, the gas space 115 of an insulating glass unit 8 can be filled with an insulative gas atmosphere. Typically, an inert gas, such as argon, is used. These inert gas fills can be advantageously provided to increase the insulating capability of the resulting units, as compared to units that contain air. U.S. Pat. Nos. 5,957,169 and 6,158,483, issued to Trpkovski, teach particularly valuable methods and apparatuses for filling insulating glass units with insulative gas. The entire contents of each of these patents are incorporated herein by reference.

As is perhaps best seen in FIG. 3, the spacer 101 is bonded to the panes 10, 10' by the first seal 103. As noted above, the first seal 103 is preferably formed of two beads of butyl sealant, such as polyisobutylene. It is noted that the spacer 101 does not extend all the way to the edges 10E of the panes 10, 10'. Rather, a small distance is left between the outer face 102 of the spacer 101 and the edges 10E of the panes 10, 10'. Thus, there is formed an end channel 215 bounded by the outer face 102 of the spacer 101 and the inner, peripheral surfaces 114, 114' of the panes 10, 10'. This end channel 215 is adapted to receive the second seal 105, as discussed below.

As noted above, a bead of sealant is also preferably applied to the outer peripheral surface of at least one of the panes of an insulating glass unit. This sealant bead is sometimes referred to as the "sash bead" or "sash glazing". As shown in to FIG. 4, the sash bead 22 is adapted to seal the insulating glass unit 8 to a sash 20, frame, or any other structure serving a similar purpose. Thus, when the insulating glass unit 8 is to be mounted to the sash 20, the insulating glass unit 8 is pressed against a peripheral surface 24 of the sash 22, thereby adhering the sash bead 22 to this surface 24 of the sash 20. The present invention includes methods and apparatus for applying both the sash bead 22 and the second seal 105 in a single operation.

Figure 5:
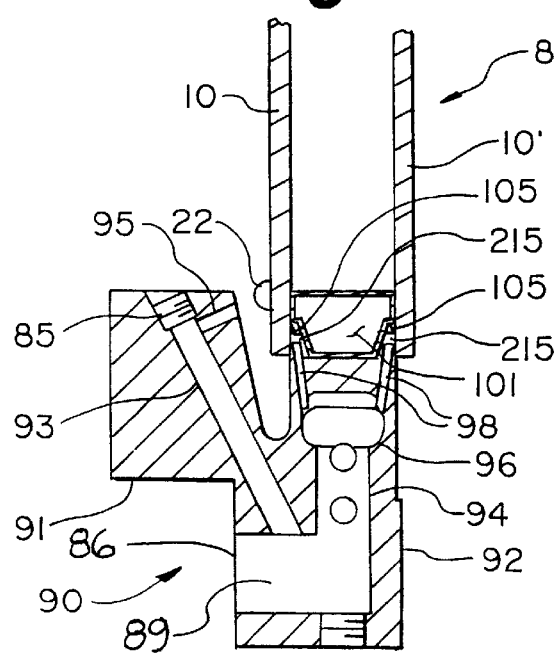
FIG. 5 is a sectional view of an apparatus of the invention, application of the second seal and sash glazing is depicted.

FIG. 5 illustrates an applicator 90 in accordance with an exemplary embodiment of the present invention. The illustrated applicator 90 comprises an applicator body including an end block 92, two end nozzles 98, a side block 91, and a side nozzle 95. The applicator 90 is operably connected to at least one sealant source (not shown). In the embodiment of FIG. 5, the end block 92 is provided with an end channel 94 that receives delivery of sealant from a single sealant source (not shown). The end channel 94 can simply be an elongated bore extending through the end block 92.

The applicator 90 can alternatively be operably connected to two separate sealant sources, which are adapted to deliver sealant respectively to the end channel 94 and side channel 93. For example, this would be preferable in cases where the end seal 105 and the sash bead 22 are formed of different materials. In the embodiment of FIG. 5, however, a single sealant source is adapted to pump sealant into the applicator 90. For example, an outlet hose (not shown) of the sealant source (not shown) can be secured to the inlet orifice 88 of the end channel 94. In such a case, the inlet orifice 88 can be provided with interior threading that is adapted to be matingly engaged with exterior threading provided on the outlet hose of the sealant source.

The sealant source can be adapted to generate sealant flow through the applicator using any desired pump system. For example, it may be preferable to utilize gear pumps, piston pumps, or some other type of positive displacement pump. In some cases, a centrifugal pump may be suitable. However, the viscosity of the sealant flowing through the applicator 90 may be too great to employ a centrifugal pump, depending upon the particular sealant used. For example, the viscosity of conventional silicone sealants typically ranges from 1 cPs to several thousand cPs. Thus, it is believed to be preferable to employ a positive displacement pump when applying most conventional silicones. For example, conventional internal or external gear pumps would likely be suitable, as would lobe or vane pumps.

With continued reference to FIG. 5, as the sealant source (not shown) pumps sealant into the inlet orifice 86, the sealant is forced through the inlet portion 89 of the end channel 94. The end channel 94 includes an intersection point, at which point the side channel 93 branches off from the end channel 94. Thus, as the pumped sealant reaches this intersection point, some of the sealant is forced into the side channel 93, while the rest of the sealant is forced further into the end channel 94. Accordingly, it can be seen that the sealant source drives two separate flows of sealant through the applicator 90.

A first flow of sealant is pumped through the end channel 94 and toward the sealant manifold 96. The end channel 94 has an outlet orifice 87 that opens into the sealant manifold 96. Thus, as the first flow of sealant reaches the outlet orifice 87 of the end channel 94, it is forced into the sealant manifold 96. In the embodiment of FIG. 5, the sealant manifold 96 has two outlets leading respectively to first and second end nozzles 98.

As is best seen in FIG. 5, the end nozzles 98 are adapted to deliver sealant into the peripheral channel or channels 215 of an insulating glass unit. Thus, the outlets of the two end nozzles 98 are advantageously separated by a lesser distance than are the peripheral inner surfaces 114, 114' of the panes 10, 10'. This allows both end nozzles 98 to be readily positioned in the peripheral channel or channels 215 of the insulating glass unit 8. With the nozzles 98 thus positioned, the flow of sealant from the end nozzles 98 fills the peripheral channels 215 of the insulating glass unit 8, thereby depositing the second seal 215. It is noted that the first seal 103 can, in some instances, be omitted. For example, FIG. 5 illustrates an insulating glass unit 8 wherein the first seal is absent. Thus, it is to be understood that the present applicator 90 can simply be used to deposit an end seal 105, whether or not such end seal 105 is truly the "second seal."

The configuration of the spacer 101 shown in FIG. 5 is such that two peripheral channels 215 are defined at the edge of the insulating glass unit 8. Thus, the outlets of the end nozzles 98 are advantageously aligned respectively with these two peripheral channels 215. This allows sealant to be deposited directly into both peripheral channels 215 and minimizes the amount of excess sealant that is left on the edge of the insulating glass unit 8.

Figure 6:
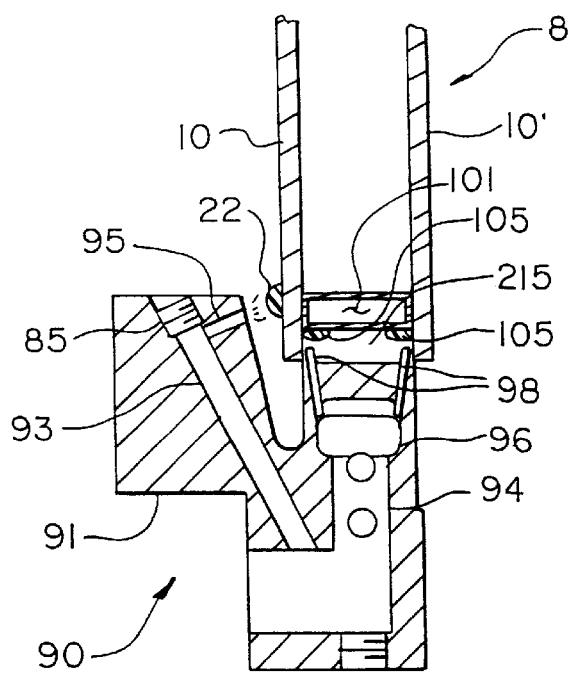
FIG. 6 is a sectional view of another apparatus of the invention, application of the second seal and sash glazing is depicted.
Figure 7:
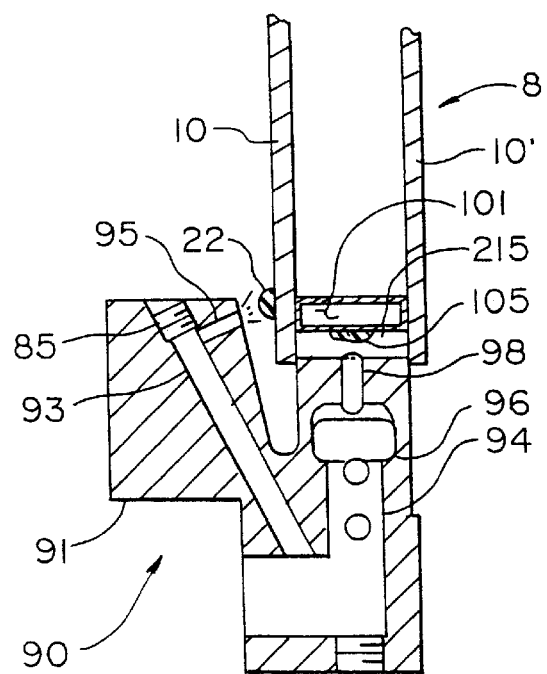
FIG. 7 is a sectional view of still another apparatus of the invention, application of the second seal and sash glazing is depicted.

The applicator 90 can also be used to deliver sealant to an insulating glass unit that has a single peripheral channel 215. This is perhaps best understood with reference to FIG. 6, wherein the configuration of the illustrated spacer 101 is such that a single peripheral channel 215 is defined. As noted above, the outlets of the end nozzles 98 are advantageously separated by a lesser distance than are the inner, peripheral surfaces of the panes 10. When depositing sealant into a single peripheral channel 215, the end nozzles 98 need not be spaced-apart. In fact, the applicator 90 can alternatively be provided with a single end nozzle 98, if so desired. For example, FIG. 7 illustrates an embodiment wherein the applicator 90 is provided with only one end nozzle 98. In an embodiment of this nature, the sealant manifold 96 can be omitted, if so desired, and the single end nozzle 98 can simply be formed as an extension of the end channel 94.

As noted above, a second flow of sealant is pumped through the side channel 93 and toward the side nozzle 95. Thus, sealant is forced through the side channel 93 until reaching the side nozzle 95, whereupon the flow of sealant is forced through this nozzle 95. With reference to FIG. 5, it can be seen that the outlet of the side nozzle 95 is adapted to apply a bead 22 of sealant to a peripheral outer surface of one of the panes of an insulating glass unit.

In operation, the insulating glass unit 8 can be held stationary during the application process as the applicator 90 is moved into engagement with, and around the perimeter of, the insulating glass unit 8. Alternatively, the applicator 90 can be held stationary while the insulating glass unit 8 is manipulated so as to translate the full perimeter of the insulating glass unit past the applicator 90.

Upon proper placement of the end nozzle or nozzles 98 inside the peripheral channel or channels 215, the pumping system of the sealant source is operated to force sealant through the applicator. As noted above, this generates two sealant flows through the applicator 90, one through the end channel 92 and another through the side channel 91. The sealant flowing through the end channel 92 is applied from the end nozzle or nozzles 98 into the peripheral channel or channels 215 of the insulating glass unit 8. Thus, the end seal 105 is deposited. At the same time, the sealant flowing through the side channel 93 is applied from the side nozzle 95 onto the outer peripheral surface of one of the panes of the insulating glass unit. Preferably, the flow of sealant from the side nozzle 95 is slowed or temporarily stopped as the applicator 95 reaches a corner of the insulating glass unit 8, as the end nozzle or nozzles 98 must travel the corner distance while the side nozzle 95 effectively rotates in place. As will be obvious to those skilled in the present art, this can be accomplished through conventional use of valves (not shown) within the applicator 90.

Figure 8:
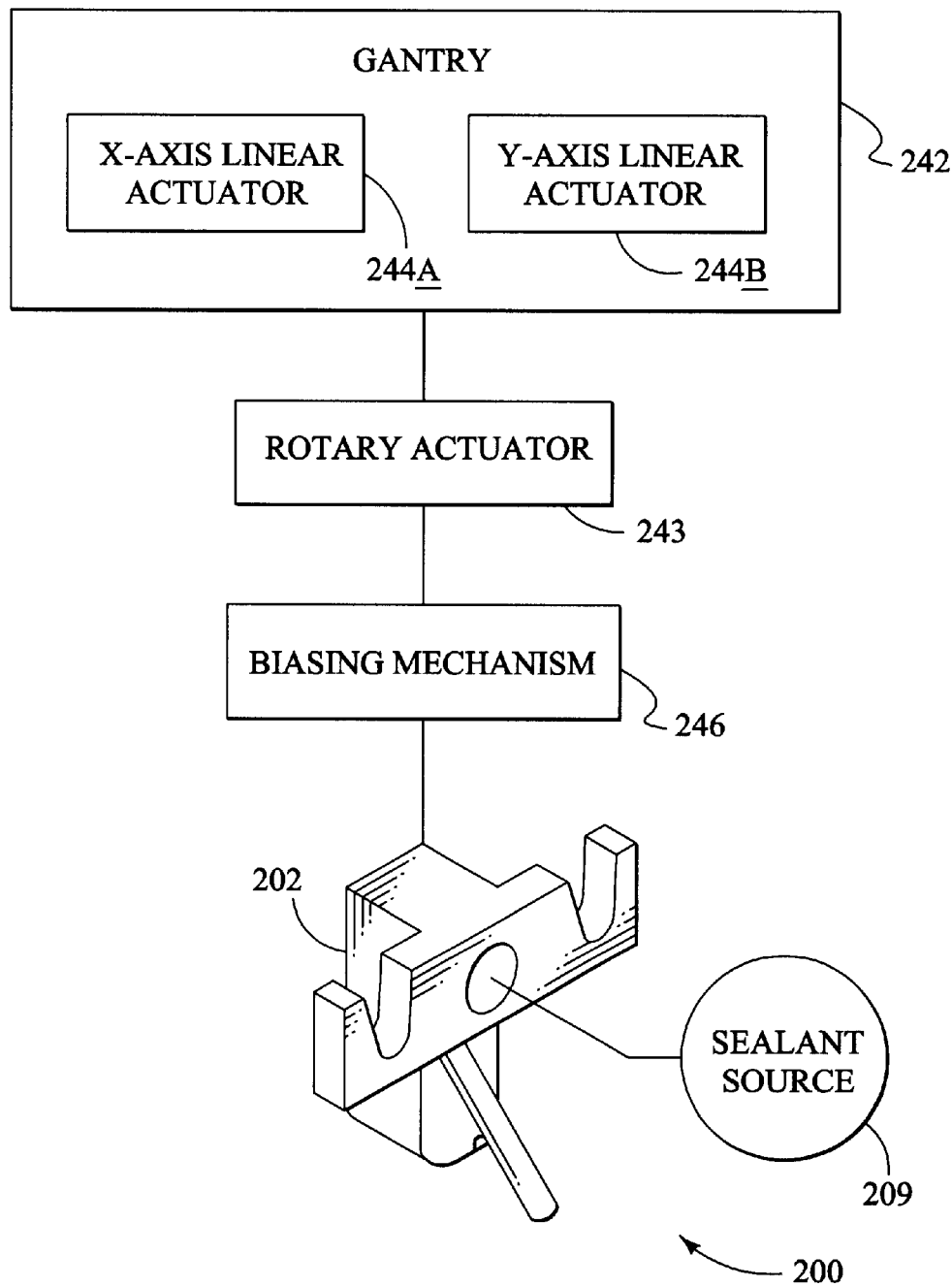
FIG. 8 is a block diagram of a sealant application system in accordance with an exemplary embodiment of the present invention.

FIG. 8 is a block diagram of a sealant application system 200 in accordance with an exemplary embodiment of the present invention. Sealant application system 200 includes an applicator 202 that is coupled to a biasing mechanism 246. In a preferred embodiment, biasing mechanism 246 is capable of urging applicator 202 toward an insulating glass unit with a preselected force. In a preferred method in accordance with the present invention, the preselected force provided by the biasing mechanism may be selected to yield a sealant bead having a desired thickness.

Biasing mechanism 246 may comprise various components without deviating from the spirit and scope of the present invention. Examples of components which may be suitable in some applications include solenoids, air cylinders, motors and springs. In one embodiment, biasing mechanism 246 comprises an air cylinder coupled to a slide. An exemplary air cylinder which may be suitable in some applications is available from Compact Air Products of West Minster, S.C., U.S.A. which identifies it by the number SD228X38. An exemplary slide which may be suitable in some applications is commercially available from THK America of Schaumburg, Ill., U.S.A. which identifies it by the number SR25.

As shown in FIG. 8, biasing mechanism 246 is coupled to a rotary actuator 243. In a preferred embodiment, rotary actuator 243 is capable of rotating biasing mechanism 246 and applicator 202 about an axis of rotation. Many embodiments of rotary actuator 243 are possible without deviating from the spirit and scope of the present invention. Rotary actuators which may be suitable in some applications are commercially available from Kollmorgen Corporation of Radford, Va.

Rotary actuator 243 is coupled to a gantry 242 that is preferably capable of moving rotary actuator 243, biasing mechanism 246, and applicator 202 in three-dimensional space. Various embodiments of gantry 242 are possible without deviating from the spirit and scope of the present invention. For example, gantry 242 may include one or more linear actuators and one or more rotary actuators. In the embodiment of FIG. 8, gantry 242 includes an x-axis linear actuator 244A and a y-axis linear actuator 244B. It is to be appreciated that many embodiments of a linear actuator are possible without deviating from the spirit and scope of the present invention. Linear actuators which may be suitable in some applications are commercially available from Lintech Corporation of Monrovia, Calif. and Tol-o-matic Corporation of Hamel, Minn.

System 206 further includes a sealant source 209 which is in fluid communication with applicator 202. Various embodiments of sealant source 209 are possible without deviating from the spirit and scope of the present invention. Sealant sources which may be suitable in some applications are commercially available from Graco Incorporated of Minneapolis, Minn.

Figure 9:
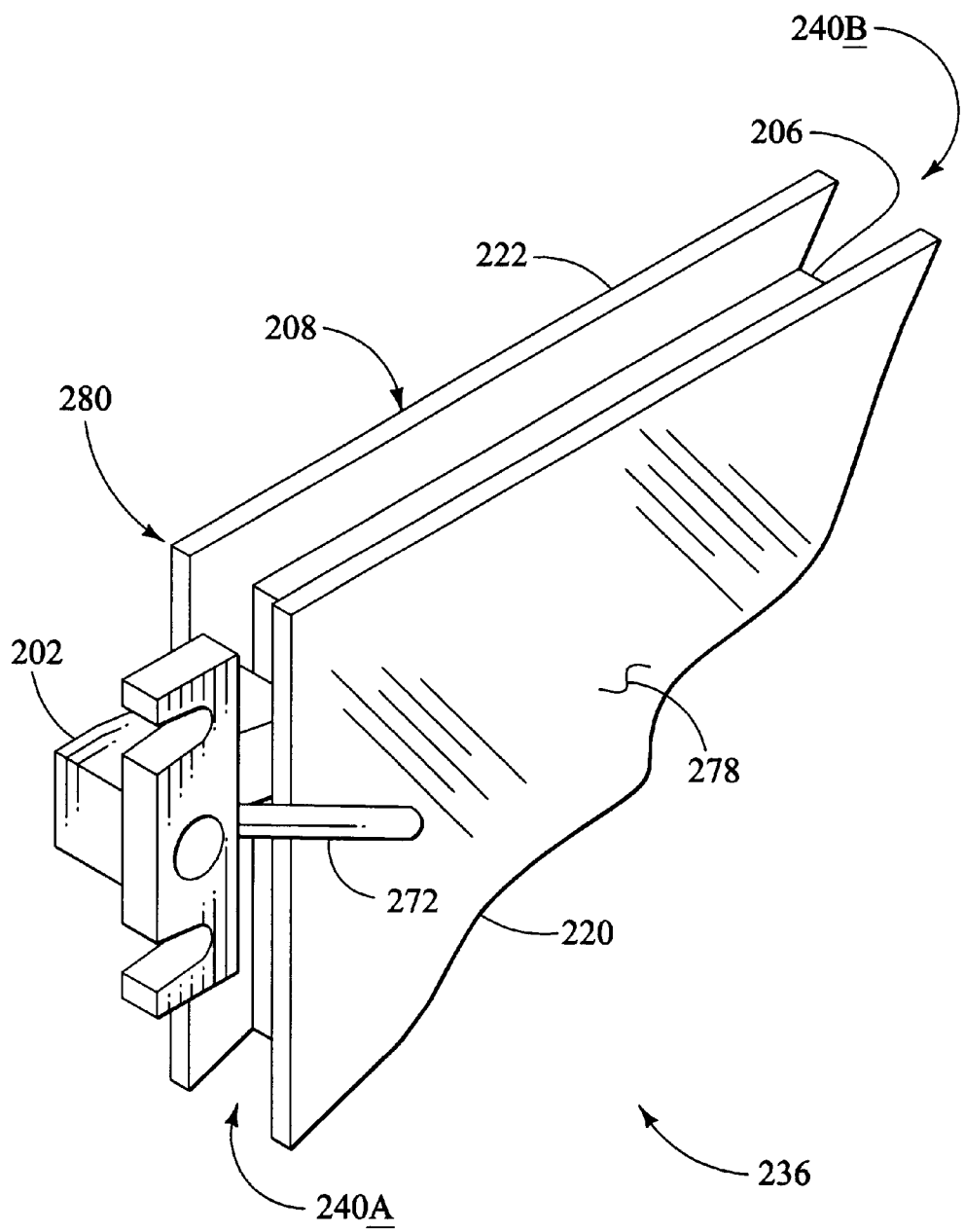
FIG. 9 is a perspective view of an illustrative assembly including applicator of FIG. 8 and an insulating glass unit.

FIG. 9 is a perspective view of an illustrative assembly 236 including applicator 202 of FIG. 8 and an insulating glass unit 208. In the embodiment of FIG. 9, applicator 202 has been positioned within a first channel 240A of insulating glass unit 208. First channel 240A is defined by the inside face of a first pane 220, the inside face of a second pane 222, and a spacer 206. Applicator 202 may be moved longitudinally along first channel 240A, for example, by gantry 242 of FIG. 8. While applicator 202 is moved along first channel 240A, a first deposit may be applied to the inside face of first pane 220. An applicator arm 272 of applicator 202 may be used to apply a second deposit to an outside face 278 of first pane 220. For clarity of illustration, the first deposit and the second deposit are not shown in FIG. 9. In some methods in accordance with the present invention, applicator 202 may also apply sealant deposits to an inside surface of second pane 222 and to a surface of spacer 206.

When applicator 202 reaches a first corner 280 of insulating glass unit 208, applicator 202 may be positioned within a second channel 240B of insulating glass unit 208. For example, applicator 202 may be moved in three dimensional space by gantry 242, and/or applicator 202 may be rotated by rotary actuator 243.

Figure 10:
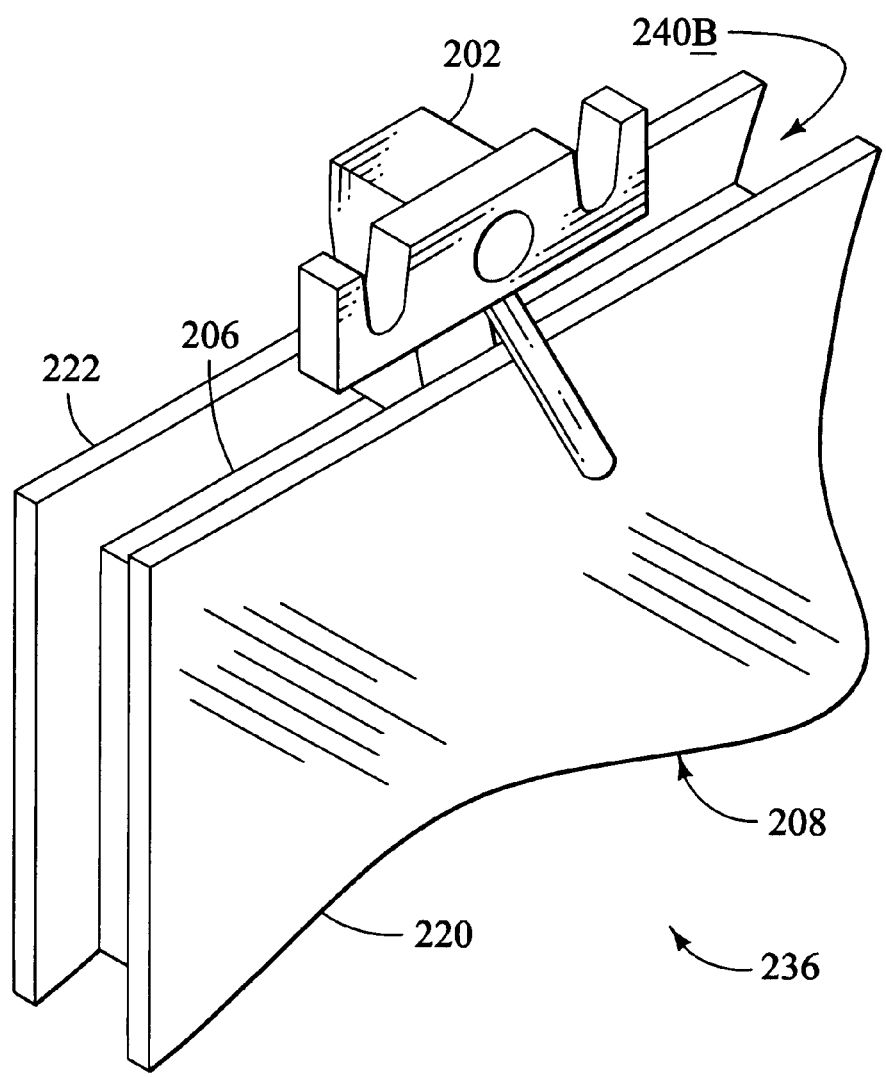
FIG. 10 is an additional perspective view of assembly of FIG. 9.

FIG. 10 is an additional perspective view of assembly 236 of FIG. 9. In the embodiment of FIG. 10, applicator 202 has been positioned within second channel 240B of insulating glass unit 208. Second channel 240B is defined by the inside face of first pane 220, the inside face of second pane 222, and a spacer 206 of insulating glass unit 208. In FIG. 10, it may be appreciated that applicator 202 has been rotated. In the embodiment of FIG. 10, applicator 202 has been rotated by approximately 90 degrees.

Figure 11:
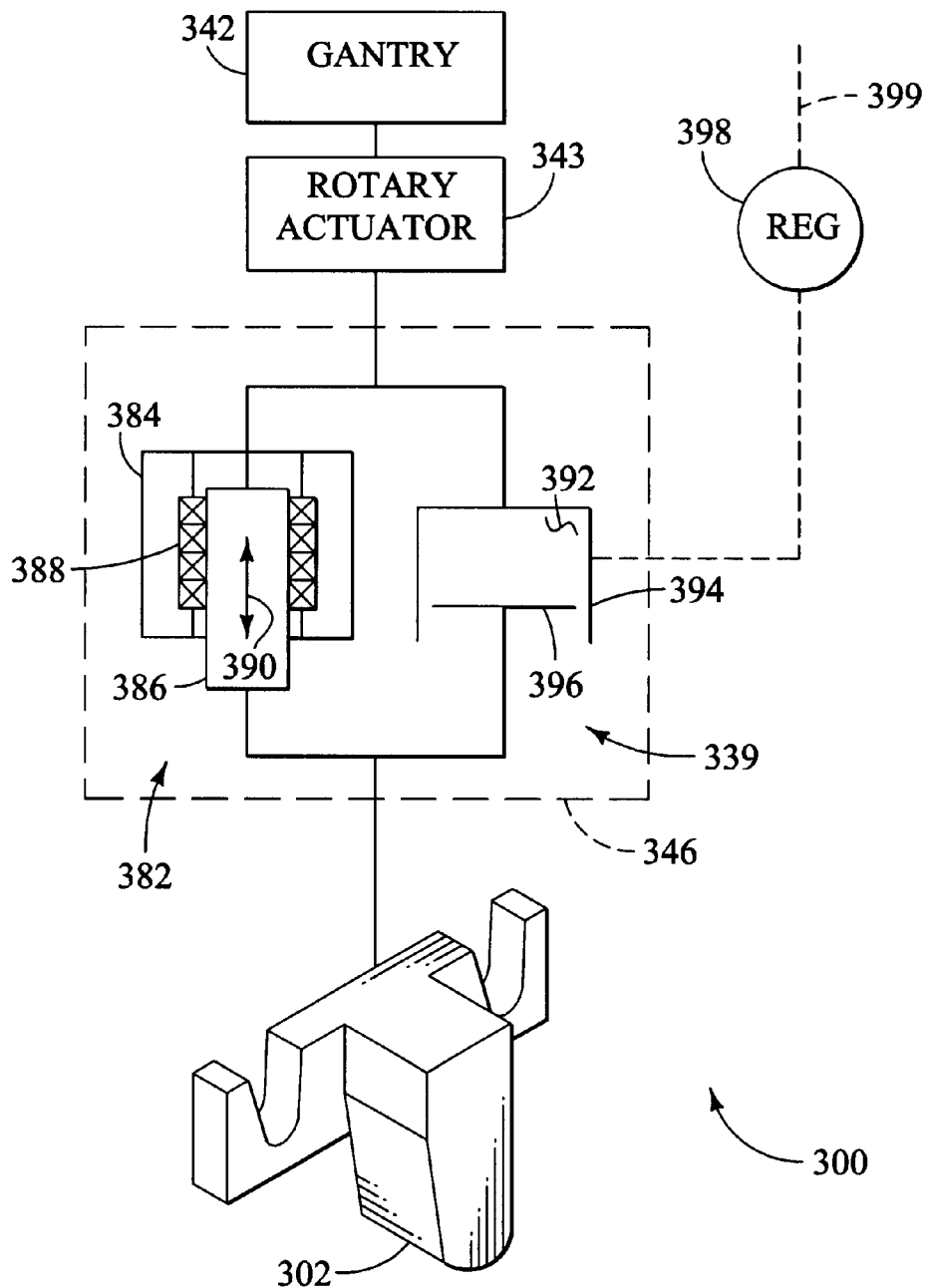
FIG. 11 is block diagram of a sealant application system in accordance with an additional exemplary embodiment of the present invention.

FIG. 11 is block diagram of a sealant application system 300 in accordance with an additional exemplary embodiment of the present invention. Sealant application system 300 includes an applicator 302 that is coupled to a biasing mechanism 346 comprising a slide 382 and an air cylinder assembly 339. Slide 382 comprises a base 384 and a saddle 386. As shown in FIG. 11 a plurality of bearings 388 are disposed between base 384 and saddle 386. In a preferred embodiment, the motion of saddle 386 relative to base 384 is guided by bearings 388. In this preferred embodiment, saddle 386 is free to move along an axis 390. Various embodiments of slide 382 are possible without deviating from the spirit and scope of the present invention. An exemplary slide which may be suitable in some applications is commercially available from THK America of Schaumburg, Ill. U.S.A. which identifies it by the number SR35.

Air cylinder assembly 339 of biasing mechanism 346 comprises a piston 396 and a cylinder 394. As shown in FIG. 11, cylinder 394 and piston 396 define a chamber 392. A regulator 398 is disposed in fluid communication with chamber 392 of cylinder assembly 336. Regulator 398 is preferably capable of controlling the fluid pressure within chamber 392. Regulator 398 is coupled to a supply line 399. In some useful embodiments, supply line 399 is disposed in fluid communication with a source of compressed air.

In FIG. 11, it may be appreciated that saddle 386 of slide 382 and piston 396 of air cylinder assembly 339 are both coupled to applicator 302. In the embodiment of FIG. 11, slide 382 and air cylinder assembly 339 cooperate to exert a preselected force upon applicator 302 along axis 390. In a preferred embodiment the magnitude of the force maybe preselected by applying a desired pressure to chamber 392 via regulator 398. In a particularly preferred embodiment, the pressure within chamber 392 may be selected such that sealant application system 300 applies a bead of sealant having a desired thickness.

In the embodiment of FIG. 11, base 384 of slide 382 and cylinder 394 of air cylinder assembly 339 are both coupled to a rotary actuator 343. Rotary actuator 343 is preferably capable of rotating applicator 302 and biasing mechanism 346 about an axis of rotation. Rotary actuator 343 is coupled to a gantry 342. Gantry 342 is preferably capable of moving rotary actuator 343, biasing mechanism 346, and applicator 302 in three dimensional space.

Figure 12:
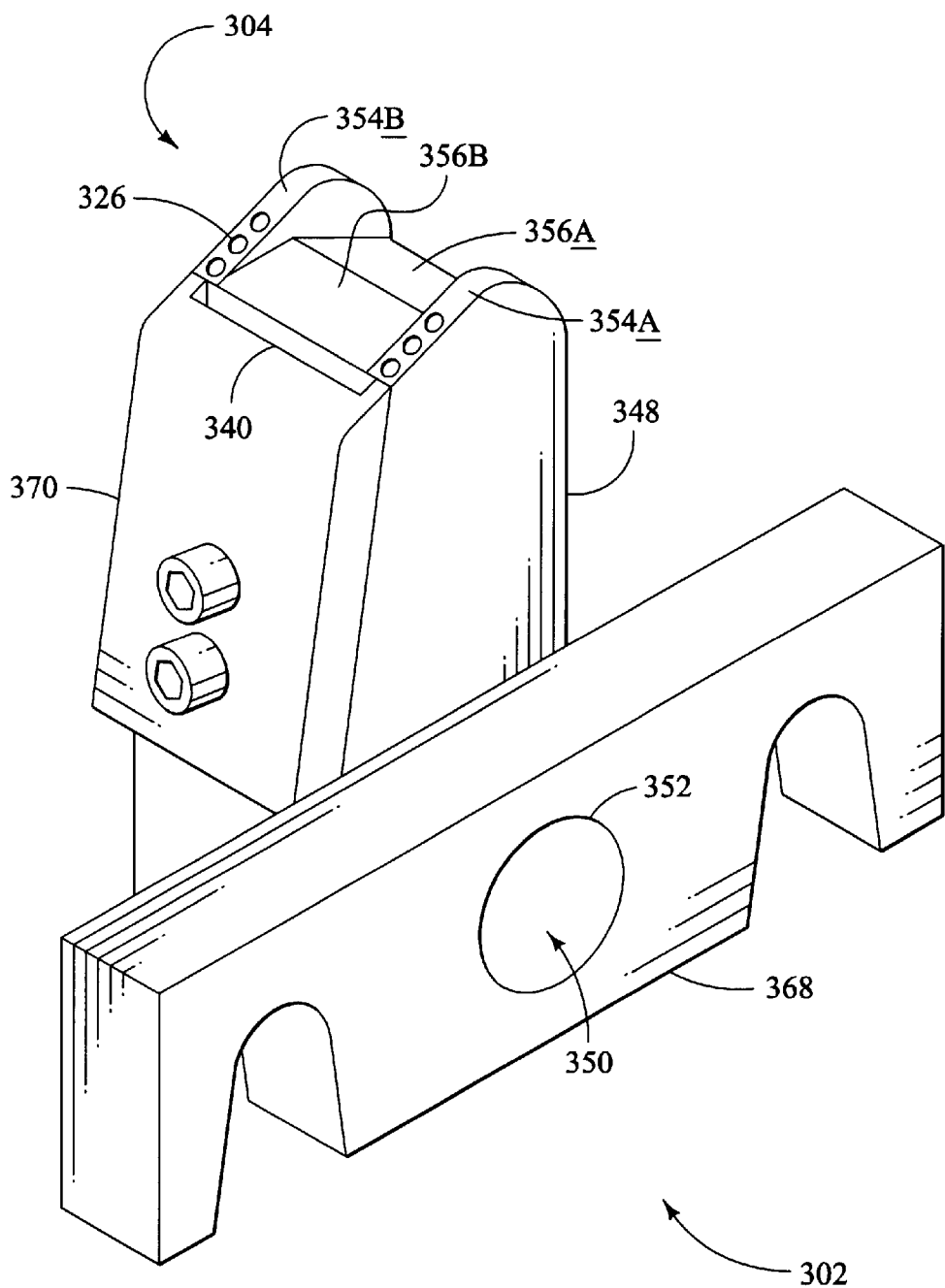
FIG. 12 is a perspective view of applicator of sealant application system of FIG. 11.

FIG. 12 is a perspective view of applicator 302 of sealant application system 300 of FIG. 11. In FIG. 12, it may be appreciated that applicator 302 includes an applicator body 348, a mounting flange 368, and a plate 370. Mounting flange 368 and applicator body 348 define a cavity 350 terminating at an inlet port 352. In the embodiment of FIG. 12, plate 370 and applicator body 348 define a flow channel 340 that is preferably in fluid communication with cavity 350 and inlet port 352. Applicator body 348 also defines a plurality of lumens 326, which are preferably also in fluid communication with cavity 350 and inlet port 352 of applicator 302.

In a preferred embodiment, flow channel 340 and lumens 326 are con figured such that sealant is dispensed substantially across the entire width of a face portion 304 of applicator 302. In the embodiment of FIG. 12, face portion 304 of applicator 302 includes a first generally curved surface 354A, a second generally curved surface 354B, a first generally flat surface 356A and a second generally flat surface 356B.

Figure 13:
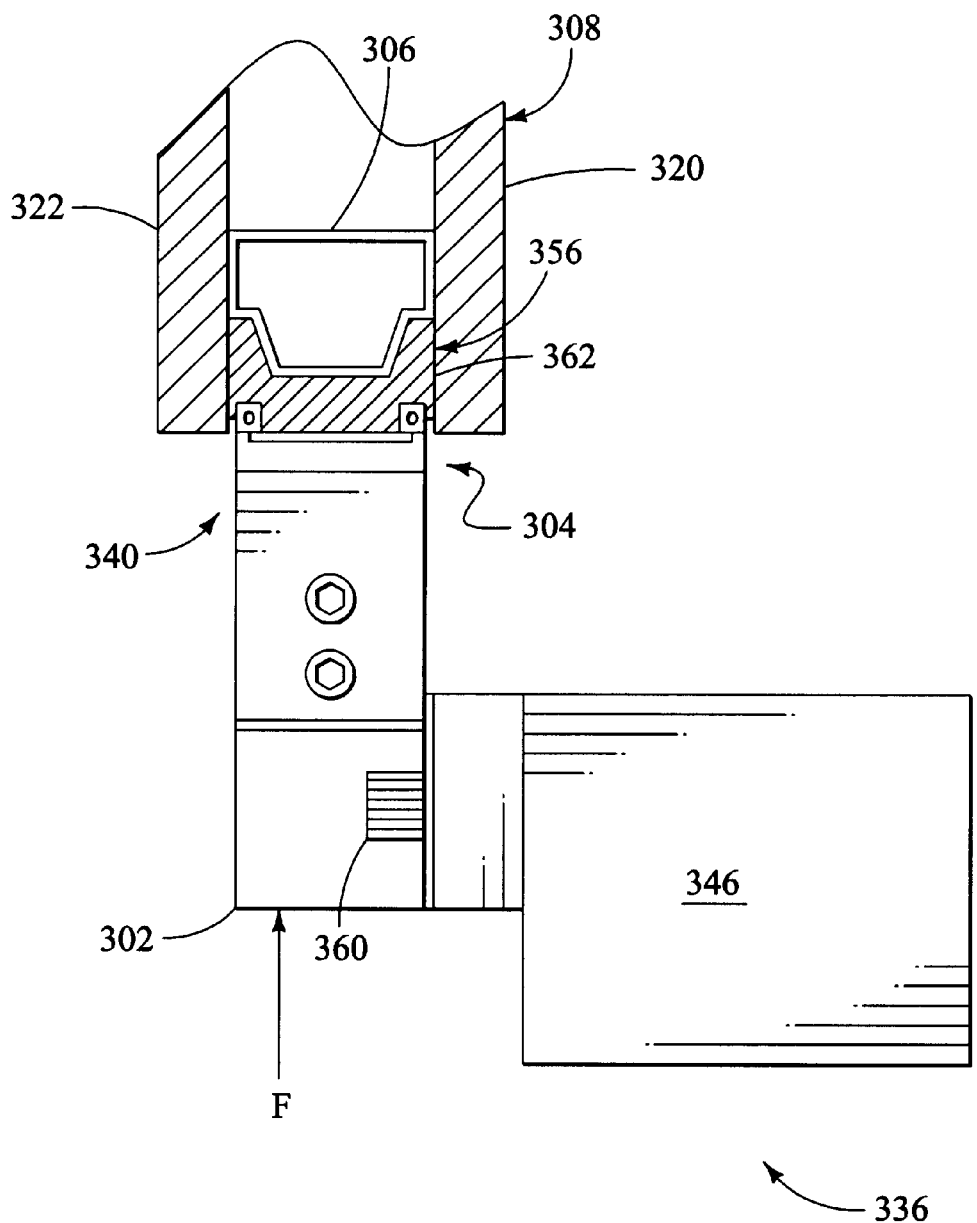
FIG. 13 is a plan view of an illustrative assembly including applicator and biasing mechanism of FIG. 11.

FIG. 13 is a plan view of an illustrative assembly 336 including applicator 302 and biasing mechanism 346 of FIG. 13. Assembly 336 also includes an insulating glass unit 308 that is shown in cross section in FIG. 13. In the assembly of FIG. 13, applicator 302 has been positioned within a channel 340 of insulating glass assembly 336. Channel 340 is defined by a first pane 320, a second pane 322, and a spacer 306 interposed between first pane 320 and second pane 322. A sealant bead 358 is interposed between applicator 302 and spacer 306.

Applicator 302 is coupled to biasing mechanism 346 by a plurality of screws 360. Biasing mechanism 346 preferably urges applicator 302 towards spacer 306 of insulating glass unit 308 with a force F. In FIG. 13, force F is represented with an arrow.

In a preferred method in accordance with the present invention, a sealant 362 is directed through lumens 326 and flow channel 340 of applicator 302 to form sealant bead 358. Sealant bead 358 preferably applies pressure on face portion 304 of applicator 302. The pressure applied to face portion 304 of applicator 302 balances force F which urges applicator 302 towards spacer 306. Advantageously, there is a relationship between the thickness of sealant bead 358 and the magnitude of the pressure applied to face portion 304 of applicator 302. Thus, methods in accordance with the present invention are possible in which force F is selected to yield a desired thickness of sealant bead 358.

Figure 14:
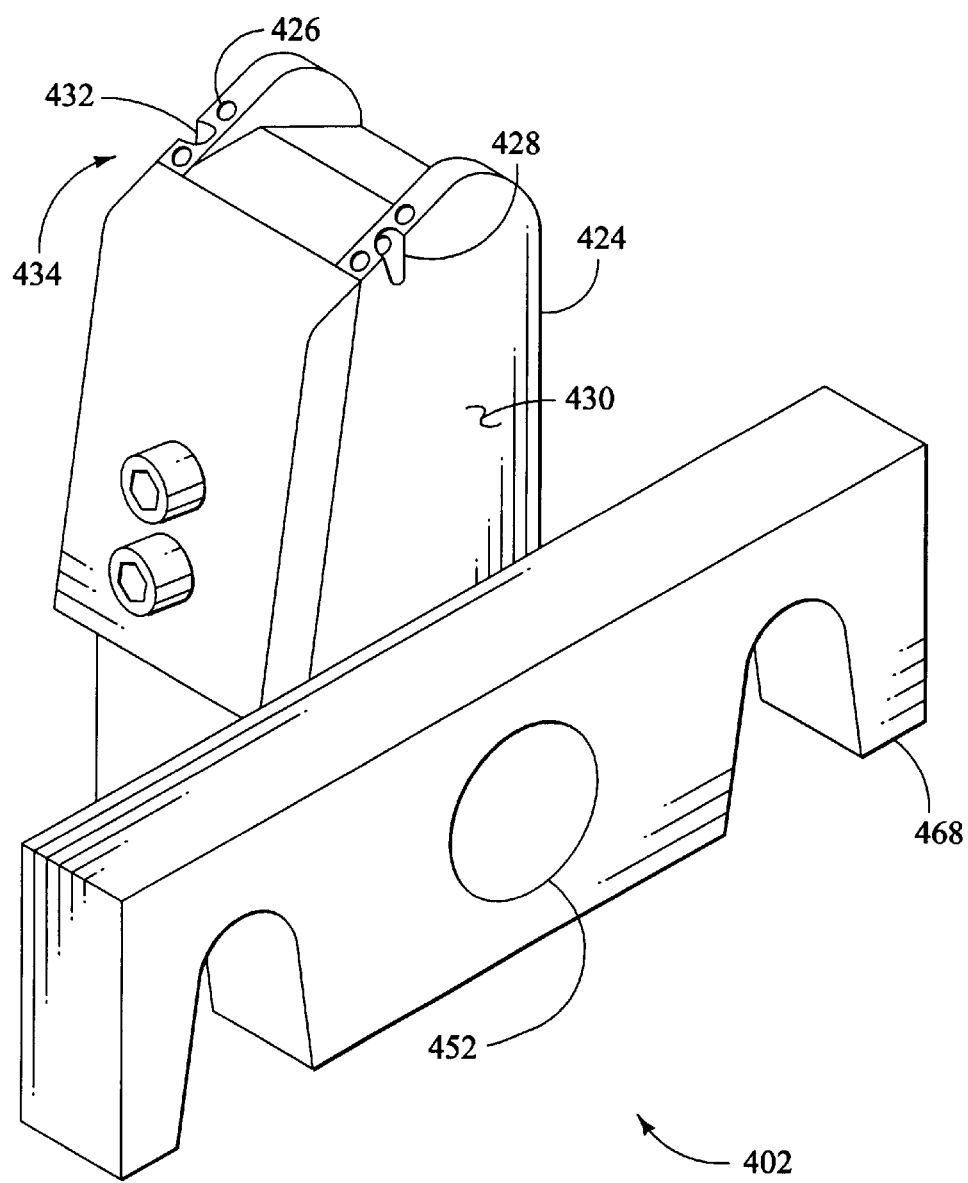
FIG. 14 is a perspective view of an additional embodiment of an applicator in accordance with the present invention.

FIG. 14 is a perspective view of an additional embodiment of an applicator 402 in accordance with the present invention. Applicator 402 includes body member 424 defining a plurality of lumens 426. Body member 424 of applicator 402 also defines a first cutout 428 which is in fluid communication with one of the lumens 426. First cutout 428 advantageously allows sealant to be dispensed along a first side 430 of applicator 402. In FIG. 14, it may also be appreciated that body member 424 defines a second cutout 432 in fluid communication with another one of the lumens 426. Applicator 402 also includes a mounting flange 468 defining an inlet port 452. Inlet port 452 is preferably in fluid communication with lumens 426. Second cutout 432 allows sealant to be dispensed along a second side 434 of applicator 402.

Figure 15:
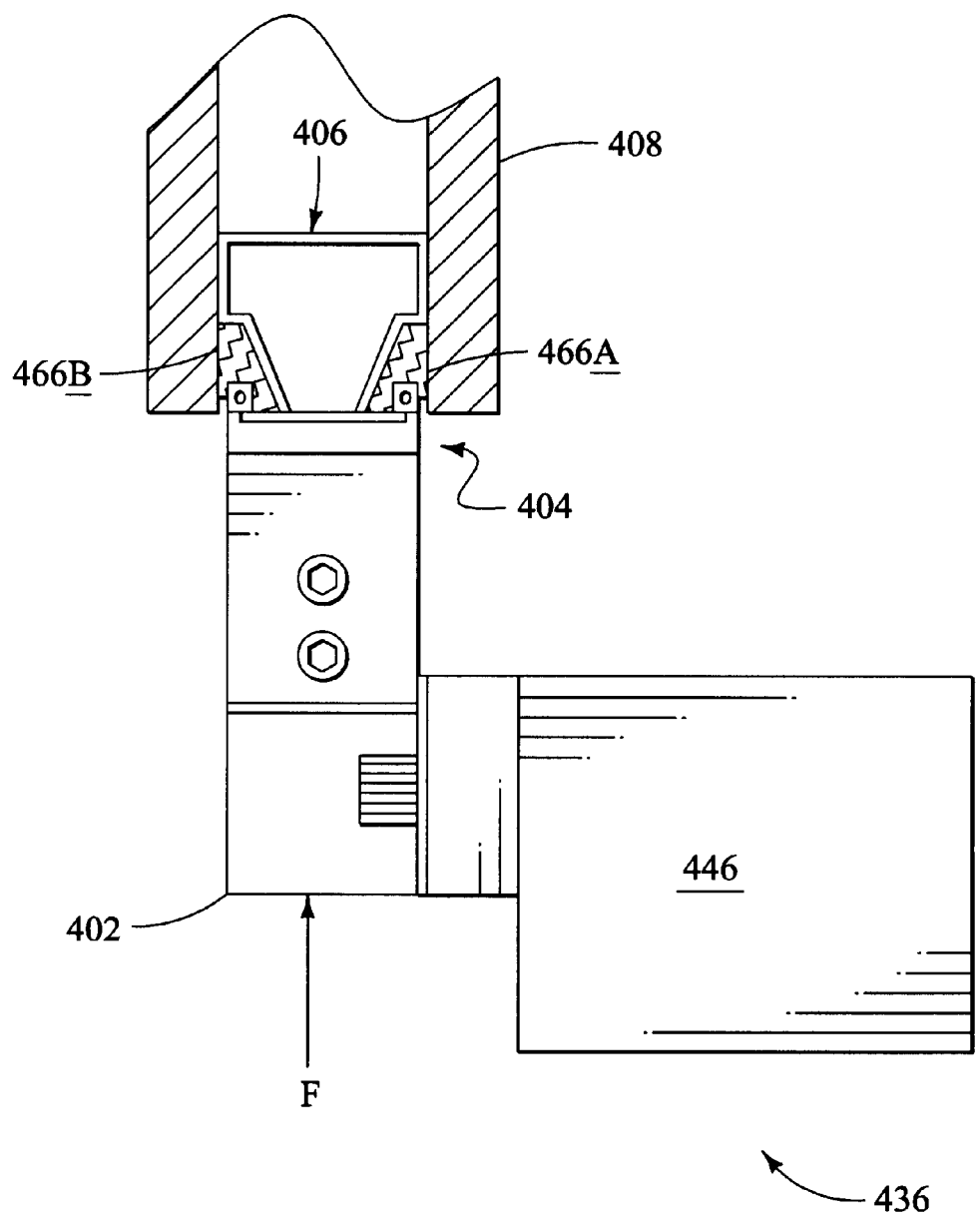
FIG. 15 is a plan view of an assembly including the applicator of FIG. 14.

FIG. 15 is a plan view of an assembly 436 including the applicator 402 of FIG. 14. In the embodiment of FIG. 15, applicator 402 is being used to apply a first bead 466A and a second bead 466B to an insulating glass unit 408. As shown in FIG. 15, applicator 402 is coupled to a biasing mechanism 446. In a preferred embodiment, biasing mechanism 446 urges applicator 402 towards a spacer 406 of insulating glass unit 408. In the embodiment of FIG. 42, the biasing force is represented by an arrow. In the assembly of FIG. 15, a face portion 404 of applicator 402 has been urged against spacer 406 by biasing mechanism 446.

Figure 16:
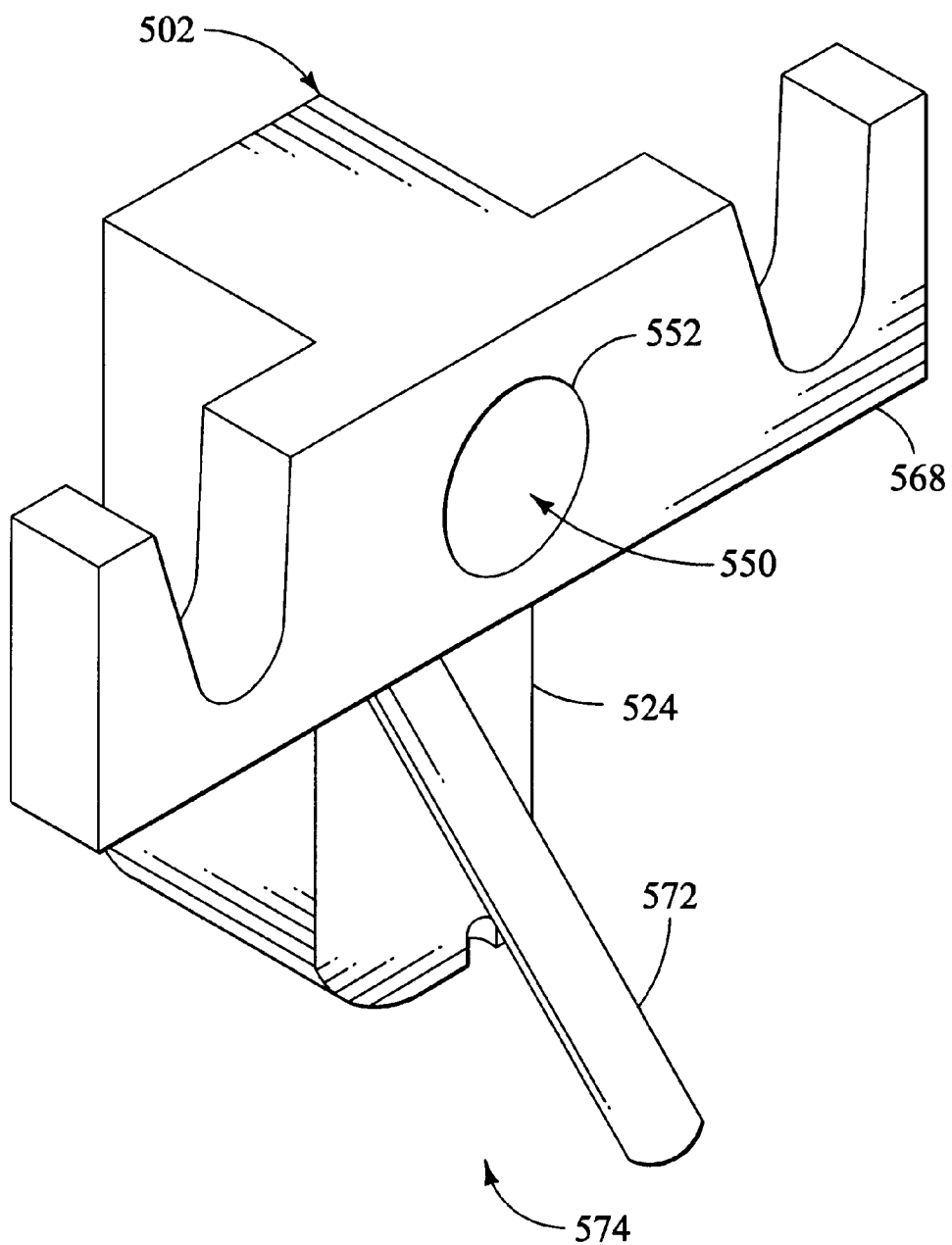
FIG. 16 is a perspective view of an additional embodiment of an applicator in accordance with the present invention.

FIG. 16 is a perspective view of an additional embodiment of an applicator 502 in accordance with the present invention. In the embodiment of FIG. 16, applicator 502 includes a body member 524 and an applicator arm 572 fixed to the body member. Body member 524 includes a mounting flange portion 568. Body member 524 defines a cavity 550 in fluid communication with an inlet port 552 defined by a mounting flange portion 568 of body member 524. Applicator arm 572 preferably defines a sealant path in fluid communication with cavity 550 and inlet port 552. In FIG. 16, it may be appreciated that body member 524 and applicator arm 572 define a gap 574. In a preferred embodiment gap 574 is configured to receive a pane of an insulating glass unit.

Figure 17:
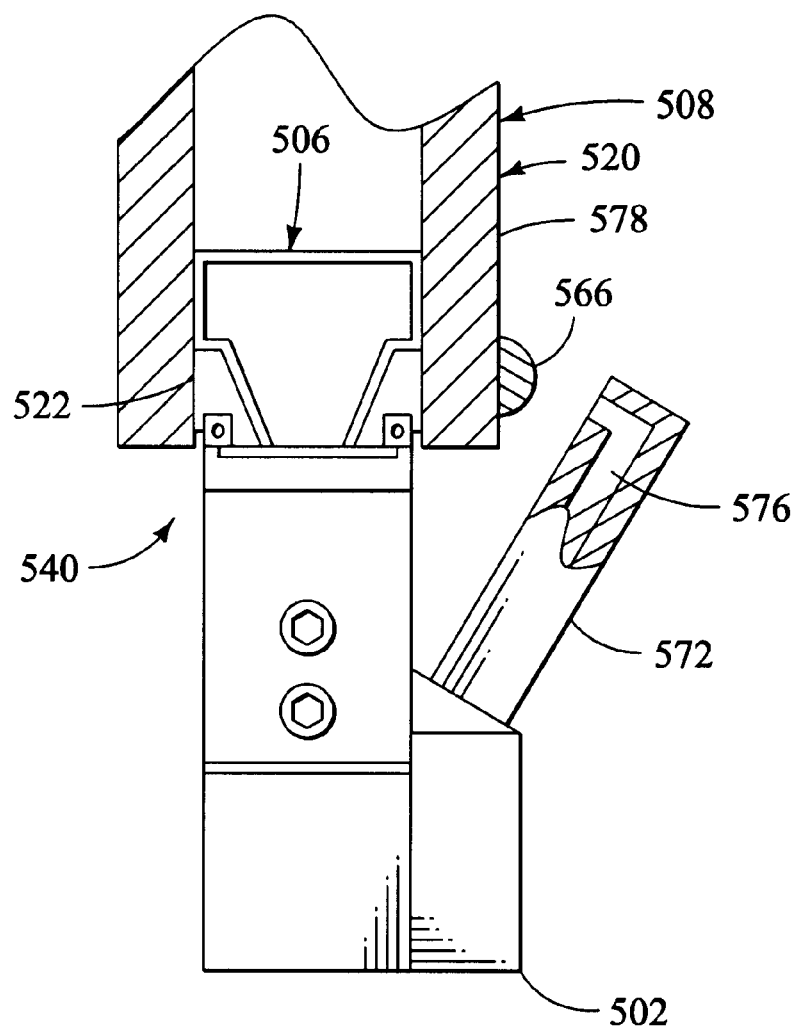
FIG. 17 is a plan view of an illustrative assembly including applicator of FIG. 16 and an insulating glass unit.

FIG. 17 is a plan view of an illustrative assembly 536 including applicator 502 of FIG. 16 and an insulating glass unit 508. In the embodiment of FIG. 17, insulating glass unit 508 is shown in cross section, and includes a first pane 520, a second pane 522, and a spacer 506 interposed between first pane 520 and second pane 522. Insulating glass unit 508 also includes a channel 540 defined by first pane 520, second pane 522, and spacer 506. In the embodiment of FIG. 17, body member 524 of application 538 is partially disposed within channel 540. In FIG. 17 it may be appreciated that applicator arm 572 of applicator 502 defines a sealant path 576. In a preferred embodiment, applicator arm 572 and sealant path 576 are configured to apply a bead 566 to an outside face 578 of first pane 520 of insulating glass unit 508.

Figure 18:
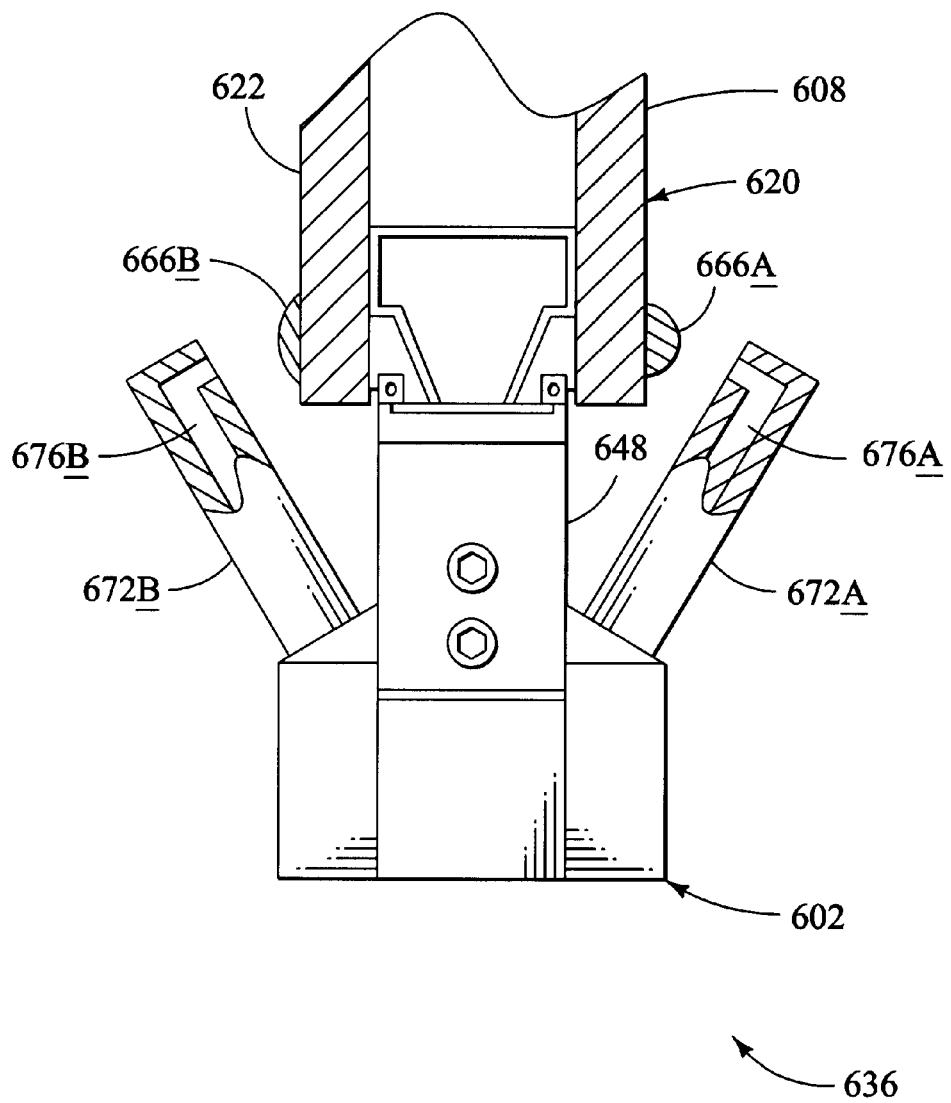
FIG. 18 is a plan view of an additional illustrative assembly including an insulating glass unit and an applicator in accordance with an additional embodiment of the present invention.

FIG. 18 is a plan view of an additional illustrative assembly 636 including an insulating glass unit 608 and an applicator 602 in accordance with an additional embodiment of the present invention. Applicator 602 of FIG. 18, includes an applicator body 648, a first applicator arm 672A, and a second applicator arm 672B. First applicator arm 672A defines a first sealant path 676A, and second applicator arm 672B defines a second sealant path 676B. In a preferred embodiment first applicator arm 672A and first sealant path 676A are configured to apply a first bead 665A to an outside surface of first pane 620. Also in a preferred embodiment, second applicator arm 672B and second sealant path 676B are configured to apply a second bead 665B to an outside face of second pane 622.

Several forms of invention have been shown and described, and other forms will now be apparent to those skilled in the art. It will be understood that embodiments shown in drawings and described above are merely for illustrative purposes, and are not intended to limit the scope of the invention defined in the claims which follow.

What is claimed is:

1. A method of fabricating a window assembly, comprising the steps of:
   providing an insulating glass unit including a first pane;
   the first pane having a inside face, an outside face, and a first edge;
   positioning an applicator proximate the first edge of the first pane;
   applying a first deposit to the inside face of the first pane; and
   applying a second deposit to the outside face of the first pane, wherein the first deposit and the second deposit are applied substantially simultaneously.

2. The method of claim 1, wherein the first deposit and the second deposit comprise the same material.

3. The method of claim 2, wherein the first deposit and the second deposit both comprise a sealant material.

4. The method of claim 2, wherein the first deposit and the second deposit both comprise an adhesive material.

5. The method of claim 2, wherein the first deposit and the second deposit both comprise silicone.

6. The method of claim 1, wherein the first deposit and the second deposit comprise different materials.

7. The method of claim 1, further including the steps of providing a window sash; and bringing together the outside face of the first pane, and the window sash so that the insulating glass unit is bonded to the window sash by the second deposit.

8. The method of claim 1, wherein the insulating glass unit further includes a second pane, and a spacer interposed between the first pane and the second pane.

9. The method of claim 8, further including the step of simultaneously applying a third deposit to an inside face of the second pane.

10. The method of claim 8, further including the step of simultaneously applying a fourth deposit to an outside face of the second pane.

11. The method of claim 10, further including the steps of providing a window sash; and bringing together the outside face of the second pane, and the window sash so that the insulating glass unit is bonded to the window sash by the fourth deposit.

12. The method of claim 8, wherein the first pane, the second pane, and the spacer define a channel.

13. The method of claim 12, wherein the step of applying the first deposit to the inside face of the first pane includes the step of substantially filling the channel with deposit.

14. The method of claim 8, further including the step of urging the applicator toward the spacer of the insulating glass unit with a preselected force.

15. The method of claim 14, wherein the preselected force is chosen to yield a desired thickness of deposit.

16. The method of claim 14, wherein the preselected force is provided by a biasing mechanism.

17. The method of claim 16, wherein the biasing mechanism comprises a slide.

18. The method of claim 16, wherein the biasing mechanism comprises an air cylinder.

19. The method of claim 18, wherein the step of urging the applicator toward the spacer of the insulating glass unit with a preselected force includes the step of maintaining a preselected pressure within a chamber of the air cylinder.

20. The method of claim 1, further including the step of moving the applicator relative to the insulating glass unit.

21. The method of claim 20, wherein the step of moving the applicator relative to the insulating glass unit includes the step of moving the applicator along a first axis, wherein the first axis is generally parallel to the first edge of the first pane.

22. The method of claim 20, wherein the step of moving the applicator relative to the insulating glass unit includes the step of moving the applicator along a first axis and moving the applicator along a second axis, the second axis being disposed at about a 90 degree angle relative to the first axis.

23. The method of claim 22, further including the step of rotating the applicator by an angle of rotation wherein the step of rotating the applicator is interposed between the step of moving the applicator along the first axis and the step of moving the applicator along the second axis.

24. The method of claim 23, wherein the angle of rotation is about a 90 degree angle.

25. A method of fabricating a window assembly, comprising the steps of:
provipaneding an insulating glass unit including a first pane, a second pane, and a spacer interposed between the first pane and the second pane;
the first pane having an inside face, and an outside face;
the second pane having an inside face and an outside face;
the inside face of the first pane, the inside face of the second pane, and a surface of the spacer defining a channel;
positioning an applicator within the channel;
biasing the applicator toward the spacer of the insulating glass unit with a preselected force; and
directing a sealant through a plurality of apertures in the applicator to form a bead of sealant between the applicator and the spacer of the insulating glass unit.

26. The method of claim 25, wherein the preselected force is chosen to yield a desired thickness of the bead, by reaching a state of equilibrium with a pressure applied to a surface of the applicator when the bead has the desired thickness.

27. The method of claim 25, wherein the preselected force is provided by a biasing mechanism.

28. The method of claim 27, where the biasing mechanism comprises a slide.

29. The method of claim 27, wherein the biasing mechanism comprises an air cylinder.

30. The method of claim 29, wherein the step of urging the applicator toward the spacer of the insulating glass unit comprises the step of maintaining a constant pressure within a chamber of the air cylinder.

* * * * *